(12) United States Patent
Shah et al.

(10) Patent No.: US 8,504,690 B2
(45) Date of Patent: Aug. 6, 2013

(54) METHOD AND SYSTEM FOR MANAGING NETWORK POWER POLICY AND CONFIGURATION OF DATA CENTER BRIDGING

(75) Inventors: Hemal Shah, Trabuco Canyon, CA (US); Uri Elzur, Irvine, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 346 days.

(21) Appl. No.: 12/848,680

(22) Filed: Aug. 2, 2010

(65) Prior Publication Data

US 2011/0035498 A1 Feb. 10, 2011

Related U.S. Application Data

(60) Provisional application No. 61/359,644, filed on Jun. 29, 2010, provisional application No. 61/304,650, filed on Feb. 15, 2010, provisional application No. 61/232,368, filed on Aug. 7, 2009, provisional application No. 61/232,035, filed on Aug. 7, 2009.

(51) Int. Cl.
*G06F 15/173* (2006.01)
(52) U.S. Cl.
USPC ............ 709/226; 709/223; 709/200; 713/320
(58) Field of Classification Search
USPC .................. 709/223, 224, 226, 200; 713/320
See application file for complete search history.

(56) References Cited

U.S. PATENT DOCUMENTS

| 6,301,613 | B1 | 10/2001 | Ahlstrom et al. |
| 6,760,761 | B1 | 7/2004 | Sciacca |
| 2004/0221025 | A1* | 11/2004 | Johnson et al. ............... 709/223 |
| 2009/0077394 | A1 | 3/2009 | Tsai et al. .................... 713/310 |
| 2010/0205471 | A1* | 8/2010 | Vavilala et al. .............. 713/340 |
| 2010/0312910 | A1* | 12/2010 | Lin et al. ....................... 709/238 |

FOREIGN PATENT DOCUMENTS

| EP | 2184890 | 5/2010 |
| GB | 2371646 | 7/2002 |
| WO | WO2006085320 | 8/2006 |
| WO | WO2009033500 | 3/2009 |

OTHER PUBLICATIONS

EPO Communication dated Apr. 18, 2011 in Application No. 11001137.6-2416.
R. Buyya, et al., Energy-Efficient Management of Data Center Resources for Cloud Computing: A Vision, Architectural Elements, and Open Challenges, retrieved from the internet at http://arxiv.org/abs/1006.0308, XP002658112, Jun. 2, 2010, 12 pages.
Communication in European Patent Application No. 11 001 137.6, dated Mar. 7, 2012, 6 pages.

* cited by examiner

*Primary Examiner* — El Hadji Sall
(74) *Attorney, Agent, or Firm* — Brinks Hofer Gilson & Lione (57) ABSTRACT

Certain aspects of a method and system for managing network power policy and configuration of data center bridging may include a network domain that comprises a single logical point of management (LPM) that coordinates operation of one or more devices, such as network interface controllers (NICs), switches, and/or servers in the network domain: The single LPM may be operable to manage one or both of a network power policy and/or a data center bridging (DCB) configuration policy for the network domain.

16 Claims, 4 Drawing Sheets

METHOD AND SYSTEM FOR MANAGING NETWORK POWER POLICY AND CONFIGURATION OF DATA CENTER BRIDGING

CROSS-REFERENCE TO RELATED APPLICATIONS/INCORPORATION BY REFERENCE

This application makes reference to, claims priority to, and claims benefit of: U.S. Provisional Application Ser. No. 61/359,644, filed Jun. 29, 2010; U.S. Provisional Application Ser. No. 61/304,650, filed Feb. 15, 2010; U.S. Provisional Application Ser. No. 61/232,368, filed Aug. 7, 2009; and U.S. Provisional Application Ser. No. 61/232,035, filed Aug. 7, 2009.

The above referenced applications are hereby incorporated herein by reference in their entirety.

FIELD OF THE INVENTION

Certain embodiments of the invention relate to networking. More specifically, certain embodiments of the invention relate to a method and system for managing network power policy and configuration of data center bridging.

BACKGROUND OF THE INVENTION

Information Technology (IT) management may require performing remote management operations of remote systems to perform inventory, monitoring, control, and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing specific management methods and/or procedures. Management devices and/or consoles may communicate with devices in a network to ensure availability of remote systems, to monitor and/or control remote systems, to validate that systems may be up-to-date, and/or to perform any security patch updates that may be necessary.

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface with Ethernet networks.

As the number of devices connected to data networks increases and higher data rates are required, there is a growing need for new transmission technologies which enable higher data rates. Increased data rates may often result in significant increases in power consumption. In this regard, as an increasing number of portable and/or handheld devices are enabled for Ethernet communications, battery life may be a concern when communicating over Ethernet networks. As networks become increasingly large and complex, network management also becomes increasingly complex. Furthermore, larger, faster, and more complex networks become increasingly costly in terms of power consumption.

Energy Efficient Ethernet (EEE) is an emerging feature for Ethernet devices that is being defined by the IEEE 802.3az task force. The basic goal of EEE is for Ethernet network links to enter power saving mode in instances when the Ethernet link is not being utilized.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing network power policy and configuration of data center bridging, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for managing network power policy and configuration of data center bridging. Various aspects of the invention may enable a unified management architecture for managing network power policy and data center bridging (DCB) configuration in a data center environment. The unified management architecture may be operable to coordinate power management modes and/or policies, power consumption, and DCB configuration on network interface controllers (NICs), servers, and switches to provide domain wide power management and DCB configuration management for the networking components.

The data center may comprise several networking components including networking interface controllers inside servers, network switches, and/or aggregation switches. Power management of the data center may comprise energy and cooling costs and limits on data center power availability from the grid. One or more power consumption schemes may be coordinated between the servers and the network, domain and/or the data center as a whole, for example. During operational and idle conditions, the network components' power mode may be aligned with the application, server, and/or user needs. During the idle condition, the power consumed by the networking components that are not in low power modes may be more significant when compared with other system components consuming minimal power.

The data center may be operable to provide a solution for a single operating system (OS), virtualization, a mix of physical and virtual servers, network and storage convergence. The data center may enable a single logical point of management (LPM) for all network devices within a single management domain. The LPM may enable management of switches, NICs, servers, NIC embedded switches and/or soft switches. The LPM may enable simplified management and an automated IT administration role. The LPM may enable elimination of miss-configuration and/or contention issues. The LPM may also enable a flexible server, network, storage and/or hypervisor integration scheme. The data center may be operable to control virtual LAN (VLAN), quality of service (QoS), jumbo frames, security, power, converged network and/or storage.

Figure 1:
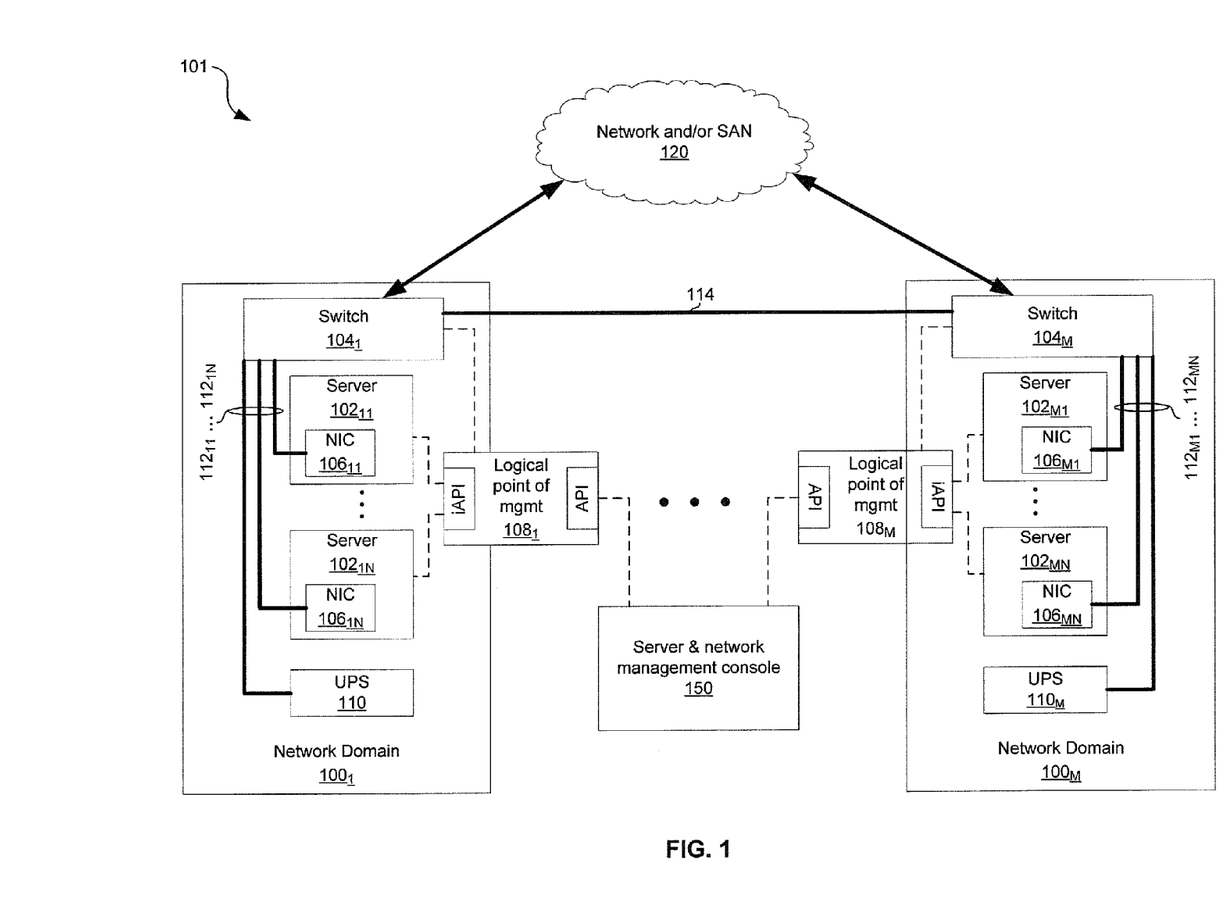
FIG. 1 is a block diagram illustrating a plurality of domains in a data center bridging (DCB) network, in accordance with an embodiment of the invention.

FIG. 1 is a block diagram illustrating a plurality of domains in a data center bridging (DCB) network, in accordance with an embodiment of the invention. Referring to FIG. 1 there is shown a plurality of domains $100_1 \ldots 100_M$ of a data center 101. Each of the plurality of domains $100_1 \ldots 100_M$ may comprise one or more racks or cabinets, for example.

The data center 101 may comprise a plurality of link layer technologies such as Ethernet, Fibre Channel, and Infiniband, for example. Accordingly, the data center 101 may utilize one or more data center bridging (DCB) techniques and/or protocols such as Congestion Notification (CN), Priority Flow Control (PFC), and/or Enhanced Transmission Selection (ETS). In this regard, the DCB protocol suite may include Pause and/or PFC for flow control management per link and/or priority class, ETS for bandwidth allocation per priority class and/or Priority Groups and DCB Exchange (DCBx) for discovery and negotiation of relevant parameters on a per link basis.

The domains $100_1 \ldots 100_M$ may comprise rack mount networking systems that may house, for example, computing devices such as servers, and networking devices such as switches, and/or other equipments such as power supplies. In an exemplary embodiment of the invention, each domain $100_X$ may comprise servers $102_{X1} \ldots 102_{XN}$, corresponding NICs $106_{X1} \ldots 106_{XN}$, a switch $104_X$, and an uninterruptable power supply (UPS) $110_X$. The data center 101 is for illustration purposes only and the invention is not limited with regard to the network topology or the particular devices within a network.

The servers $102_{X1} \ldots 102_{XN}$ of domain $100_X$ may each comprise suitable logic, circuitry, interfaces, and/or code that may be operable to provide services to client devices, such as PCs, mobile devices, or other servers. Each of the servers 102 may be operable to, for example, run one or more applications that process input from the clients and/or output information to the clients. Each of the servers 102 may interface to the network via a NIC 106.

The NICs $106_1 \ldots 106_N$ of each of the domains $100_1 \ldots 100_N$ may comprise suitable logic, circuitry, interfaces, and/or code that may be operable to interface the corresponding servers $102_1 \ldots 102_N$ to a corresponding switch 104.

Each of the switches $104_1 \ldots 104_M$ may comprise suitable logic, circuitry, interfaces, and/or code that may be operable to forward packets between corresponding NICs 106, other ones of the switches $104_1 \ldots 104_M$, and other networks and/or storage area networks 120.

Aspects of the invention enable network management of computing devices, for example, servers and networking devices, for example, switches via a single LPM. Furthermore, both computing devices and networking devices in a network may be managed and/or configured via a single management console. In this regard, the LPMs $108_1 \ldots 108_M$ may be logically coupled to the various devices of the domains $100_1 \ldots 100_M$ and the management console 150.

With reference to the exemplary domain $100_1$ for illustration, the LPM $108_1$ may enable management and/or configuration of the servers $102_{11} \ldots 102_{1N}$, the corresponding NICs $106_{11} \ldots 106_{1N}$, the switch $104_1$ and the UPS $110_1$ via the management console 150. In this regard, the LPM $108_1$ may expose an application programming interface (API) of the domain $108_1$ to the management console 150. In various embodiments of the invention, the LPM $108_1$ may be implemented via logic, circuitry, interfaces, and/or code in the domain $100_1$. In this regard, resources of the servers $102_{11} \ldots 102_{1N}$, resources of the switch $104_1$, and/or dedicated resources of the domain $100_1$ itself may be utilized to implement the LPM $108_1$. The LPM $108_1$ may be operable to translate commands and requests of the management console 150 to a device native. The LPM $108_1$ may be operable to provide a single control point for the domain $100_1$ which may distribute network configuration to other servers $102_{11} \ldots 102_{1N}$ and the NICs $106_{11} \ldots 106_{1N}$ in the domain $100_1$.

Each LPM $108_X$ may provide a single control point for all and/or various devices in a network domain. Each LPM $108_X$ may gather management and/or configuration information from the devices of a network domain and make the information available via the management console 150. Each LPM 108 may distribute management and/or configuration information to the devices of a network domain and the information may be provided by server and/or network administrators via the network management console 150.

Aspects of the invention may enable exchanging information to discover and/or configure various devices in the network 101. In this regard, one or more parameters in link partners that communicate over a communication link in the data center 101 may need to be configured to enable reliable communication across the link. Accordingly, if there is a configuration mismatch then communication over the link may fail or be sub-optimal. For example, if there is a parameter mismatch between the server $102_{11}$ and/or NIC $106_{11}$ and the switch $104_1$ then communication over the corresponding link $112_{11}$ may fail or be sub-optimal. Similarly, if there is a configuration mismatch between the switch $104_1$ and the switch $104_M$ the communication over the link 114 may fail. Moreover, communication partners that are not link partners, but communicate over multiple links (multiple "hops") may also need to have matching configurations to enable reliable communication end-to-end. For example, server $102_{1N}$ may communicate with the server $102_{M1}$ over the links $112_{1N}$, 114, and $112_{M1}$ and thus configuration may match end-to-end. Accordingly, aspects of the invention may enable validating that such configurations do match or are consistent with each other. Furthermore, aspects of the invention may enable detecting and/or correcting configuration mismatch or inconsistencies among many or in some instances all devices in a domain.

In various embodiments of the invention, the validation may be performed via the LPMs 108 and/or the single management console 150. The validation may be automatic or may be initiated by an administrator. In various embodiments of the invention, configuration of one networking or computing device in the data center may trigger automatic validation and/or configuration of link partners to ensure end-to-end configuration match. The when, how, and which link partner performs validating and/or updating of configuration parameters may be determined on a parameter-by-parameter basis.

In accordance with another embodiment of the invention, DCB may be configured on a link by link basis. The data center 101 may be operable to provide a service that may extend DCB end-to-end to ensure matching configuration and proper functionality. In one embodiment of the invention, all the links in the domain $100_X$ may use the same configuration. In another embodiment of the invention, some links may support one policy and other links may support another policy, for example, Fibre Channel over Ethernet (FCoE) at 10 Gb/s with lossless links connected to some hosts, while other hosts may not use FCoE or may have different bandwidth sharing links.

The network administrator may provide per application policies that may drive the per priority policies for the network. For example, one or more priorities may be configured for lossless service while other priorities may be configured for best effort. The policies may comprise identifying the priority or priorities to use for FCoE and/or Internet small computer system interface (iSCSI). There may be one or more policy profiles configured for links depending on the mix of applications delivered over those links. The policy profiles may include, for example, minimum and optimal bandwidth allocations per priority or traffic class group. The server administrator may configure which applications are enabled on each NIC $106_{XY}$ or may select a policy profile for each NIC $106_{XY}$. In instances where two or more policies interfere, the LPM $108_X$ may enable determination of best possible configuration, such that priorities may be given at least their minimum bandwidth if their optimal bandwidth is not available. The LPM $108_X$ may also report and/or send error messages based on results such as when it cannot provide the minimum bandwidth. The switch $104_X$ may be operable to configure an adjacent NIC port $106_{XY}$ for DCB. The LPM $108_X$ may ensure that the DCB features are configured consistently in the domain $100_X$, for example, PFC is configured for the same priorities from the NIC $106_{XY}$ to the top of the row.

The DCBx may use the concept of "Willing" or "Not Willing" to let the two link partners take roles as to which partner is driving the configuration. In a NIC-switch link, the switch $104_X$ may assume the master role and drive the configuration. However on a switch to switch link, the roles may not be clear and both ports may be configured as Not Willing, for example. In instances where there is a switch uplink connected to a switch downlink, for example, switch $104_X$ to switch $104_Y$, the network administrator may configure the uplink ports as Willing where both ports are Not Willing or both are Willing. The DCBx may provide the information which may allow both sides of the link to detect that there is a configuration mismatch. The switch $104_X$ may report the mismatch to the LPM $108_X$ so that the mismatch may be corrected or an alert may be generated.

In accordance with another embodiment of the invention, the LPM $108_X$ may be operable to ensure that DCB is set appropriately across a path that hosts use for accessing a resource or another host. An OS configuration for QoS may comprise a local administrator that may configure the OS to assign 802.1 priorities to frames, if the host networking stack QoS packet scheduler has been installed and the network driver interface specification (NDIS) driver is enabled for 802.1Q/p VLAN tagging. The local administrator and/or server administrator may configure the NIC $106_{XY}$ for DCB operation that is not tied into the host QoS operation.

In accordance with another embodiment of the invention, the DCB capabilities of the NIC $106_{XY}$ and/or switch $104_X$ may comprise one or more of support for PFC and a number of lossless traffic classes, support for ETS, and a number of traffic classes, and support for quantized congestion notification (QCN). The DCB capabilities of the NIC $106_{XY}$ and/or switch $104_X$ may further comprise one or more of a number of rate limiters or NICs, a number of congestion points (CPs), iSCSI support, FCoE support, a maximum frame size per lossless priority, and/or a maximum frame size for port and maximum for any priority.

In accordance with another embodiment of the invention, a DCB policy may comprise details regarding a desired configuration policy that may account for the server administrator goals. The DCB configuration may comprise actual values used for the DCB parameters. In an exemplary embodiment, the DCB policy may comprise PFC including a willing bit for PFC type, length and value (TLV), and priorities for which PFC may be enabled, ETS including a willing bit for ETS TLV, mapping of priority to traffic class and traffic class group (TCG) table or priority group, traffic class group bandwidth allocation, and a symmetric policy, such that ETS configuration of link partners match. The DCB policy may also comprise QCN support including priorities for which QCN is enabled, QCN parameters, iSCSI support including priority assigned for iSCSI, FCoE support including priority assigned for FCoE, a maximum frame size per lossless priority, and/or a maximum frame size for port and maximum for any priority.

Each of the DCB parameters may comprise supported and enabled bits as well as the configuration when enabled, for example, the priorities on which PFC is enabled or the traffic class groups and weights for ETS. The data center 101 may ensure that grouping of priorities into traffic class groups is consistent. The data center 101 may also ensure that grouping of priorities into TCG may be performed in adherence to the communicated TLVs. For example, priorities related to storage may be grouped in one TCG, and share a rate limiting (RL) parameter, if QCN is enabled.

Exemplary PFC mismatches may occur, and may comprise switch $104_X$ and NIC $106_{XY}$ PFC enable mismatch, switch $104_X$ and NIC $106_{XY}$ PFC enabled priorities mismatch, a maximum frame size for PFC priority does not match at link partners, a maximum frame size for port may not match at link partners, and/or PFC not enabled for FCoE. Exemplary PFC mismatches may also comprise PFC not enabled for iSCSI if policy indicates that it is desired, PFC is desired but not supported on the port, and/or a link partner may detect reception of PAUSE on a link where PFC is enabled.

Exemplary ETS mismatches may occur, and may comprise switch $104_{1X}$ and NIC $106_{XY}$ ETS enable mismatch, priority that is supposed to be strict priority may not be in TCG 15, priority that is supposed to be ETS is in TCG 15, priorities in the same traffic class may not all be in the same traffic class group or a traffic class may be a subset of one traffic class group, and/or bandwidth allocations may not match LPM $108_X$ configured guidelines. Exemplary ETS mismatches may also comprise TCG or bandwidth mismatch between link partners, if ETS configuration is intended to be symmetric, ETS shares may not total 100%, and/or symmetric bandwidth allocation based on the nature of the traffic, for example, 10 Gb/s on a FCoE connection in both directions is desired, but may not be configured or supported.

Exemplary QCN mismatches may occur, such as switch $104_X$ and NIC $106_{XY}$ QCN enabled mismatch, switch $104_X$ and NIC $106_{XY}$ QCN enabled priorities mismatch, NIC RL parameters may not conform to LPM $108_X$ configuration for that priority, switch $104_X$ CP parameters may not conform to LPM $108_X$ configuration for that priority.

Exemplary DCB global mismatches may occur, such as PFC and non-PFC priorities sharing a traffic class, PFC and non-PFC priorities sharing a traffic class group, and/or different assignment of application to traffic classes on different links in the domain. Exemplary DCB global mismatches may also comprise DCB wide consistency mismatch, for example, miniscule bandwidth allocation for an active storage priority, a behavior may be desired but not supported by a device, and/or an OS may be configured for independently setting priority bits in frames to be transmitted and DCB may be negotiated by the NIC $106_{XY}$.

In accordance with another embodiment of the invention, lossless behavior may be required for FCoE and may be necessary for some other proprietary protocols. In other cases such as iSCSI, lossless links may improve performance but may not be strictly required. To support this policy, the data center 101 may enforce lossless behavior as required or as desired on a priority. In instances where the data center 101 detects that lossless behavior is required on a priority but not supported in the NIC $106_{XY}$, the LPM $108_X$ may flag it as a mismatch case or based on policy set by the administrator enable 802.3 PAUSE on the NIC $106_{XY}$ to switch $104_X$ link. On a switch to switch link or a NIC-switch mismatch, the LPM $108_X$ may report the problem to the administrator. The use of PFC and PAUSE on the same link may not be allowed. In accordance with an embodiment of the invention, it may be possible that both PFC and PAUSE have been enabled for the link, since PAUSE operation may be negotiated in auto-negotiation for the link and PFC configuration may be detected in DCBx link layer discovery protocol (LLDP) exchanges after the link is in operation. In such an instance, once PFC has been enabled, requests to send PAUSE frames may not be initiated and only PFC may be used. In instances where PFC is configured for more priorities than the number of lossless classes that the port can support, multiple PFC priorities may be grouped into the same traffic class. If the number of traffic classes supported on a port is less than the number of TCGs, the TCGs may be configured into the same traffic class. In this case, the traffic class may be given the combined bandwidth allocation for the TCGs.

In accordance with another embodiment of the invention, the LPM $108_X$ may ensure that priorities have a consistent configuration from the NIC $106_{1X}$ through all the switches $104_X$ in the domain $100_X$. The LPM $108_X$ may have a desired DCB configuration for the domain $100_X$. The LPM $108_X$ may attempt to match port configurations to that profile and if a port cannot be configured to match, the LPM $108_X$ may be enabled to alert the administrator. The LPM $108_X$ may also have a database comprising a set of DCB profiles and a mapping of systems to profiles for instances based on MAC or IP addresses. When a system is connected, the LPM $108_X$ may attempt to apply the configuration for that system's profile to the NIC $106_{XY}$ and its corresponding switch $104_X$ and generate an alert if it cannot be applied. When a virtual machine (VM) is migrating, the LPM $108_X$ may be operable to check that the destination port DCB configuration is consistent with the profile for that VM. In instances where the destination port DCB configuration is not consistent with the profile for that VM and the profiles of other VMs already on the destination NIC and switch ports allow for the required change, then the LPM $108_X$ may be operable to change the configuration of the NIC $106_{XY}$ and switch $104_X$ ports as required. In instances where the profiles or the port capabilities may not allow for the change, the LPM $108_X$ may be operable to generate an alert.

Figure 2:
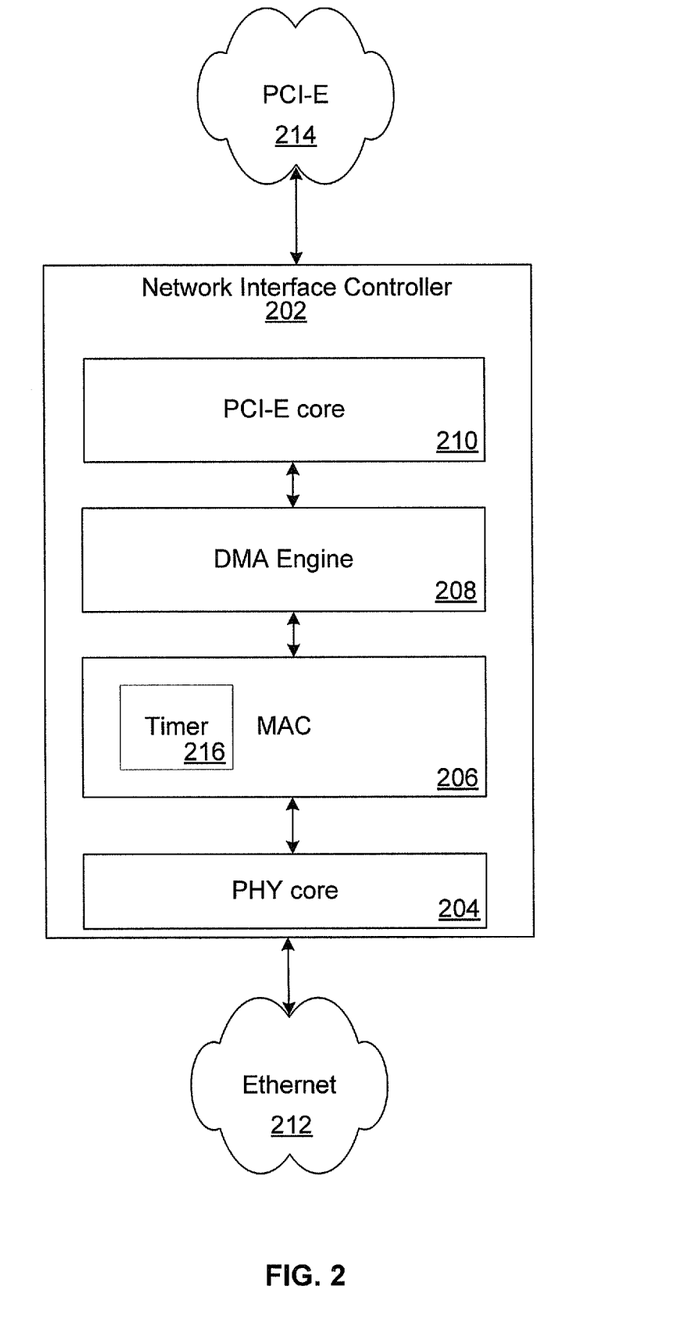
FIG. 2 is a block diagram illustrating an exemplary network interface controller that is operable to support PCI-E and energy efficient Ethernet for optimizing power management, in accordance with an embodiment of the invention.

FIG. 2 is a block diagram illustrating an exemplary network interface controller that is operable to support PCI-E and energy efficient Ethernet for optimizing power management, in accordance with an embodiment of the invention. Referring to FIG. 2, there is shown a NIC 202, a network interface, for example, the Ethernet 212, and a PCI-E core 214. The network interface 202 may comprise a physical layer (PHY) processor 204, a MAC 206, a DMA engine 208, and a PCI-E core 210.

The NIC 202 may comprise suitable logic, interfaces, code, and/or one or more circuits that may be operable to support Energy Efficient Ethernet (EEE), for example.

The PHY core 204 may comprise suitable logic, interfaces, code, and/or one or more circuits that may be operable to receive and/or communicate packets via the network interface, for example, the Ethernet 212. When the NIC 202 has been idle for a particular period of time, the PHY core 204 may transition to a lower power mode, for example, a low power idle mode, as specified by IEEE 802.3az specification. The transition of the PHY core 204 to the low power mode may be transparent to the operating system on the network endpoint. The time period of transitioning from the low power mode to a full power mode may be referred to as the wake time, Tw, of the PHY core 204.

The MAC 206 may comprise suitable logic, interfaces, code, and/or one or more circuits that may be operable to support the Ethernet 802.3 protocol, interface to the PHY core 204, support packet classification and error detection logic for incoming packets, and support memory for temporary packet buffering. The MAC 206 may be operable to handle offloading of tasks such as checksum calculations, accelerating TCP/IP or IPSEC traffic, for example. The MAC 206 may be operable to centrally manage power management policies for the NIC 202. The MAC 206 may comprise a timer 216. The timer 216 may comprise suitable logic, code, and/or one or more circuits that may be operable to store a particular time period.

The DMA engine 208 may comprise suitable logic, interfaces, code, and/or one or more circuits that may be operable to initiate direct memory access (DMA) read and write requests to the PCI-E core 210.

The PCI-E core 210 may comprise suitable logic, interfaces, code, and/or one or more circuits that may be operable to generate DMA requests on the PCI-E core 214, support PCI-E protocol, and provide PCI-E target support. The PCI-E core 210 may comprise a power saving feature, for example, Active State Power Management (ASPM). The ASPM feature of the PCI-E core 210 may comprise three power states, for example, a low power PCI-E state, L1, a low resume latency energy saving "standby" state, L0s, and a full power PCI-E state, L0. The low power PCI-E state, L1 may be operable to save considerably more power than the full power PCI-E state, L0, but may also have a greater impact to performance and responsiveness. When the low power PCI-E state, L1, is enabled on a given PCI-E core 214, and if the PCI-E core 214 has been inactive for a period of time, for example, 10-5000 microseconds, the PCI-E core 210 may transition to the low power PCI-E state, L1 that may consume much less power than the full power PCI-E state, L0. While in the low power PCI-E state, L1, a PCI-E clock in the PCI-E core 210 may be stopped and a phase locked loop (PLL) may be powered down to save power in the NIC 202. However, the PCI-E core 210 needs to be returned to the full power PCI-E state, L0 for a device to start a transfer of data across the PCI-E core 214. The time period of transitioning from the low power PCI-E state, L1, to the full power PCI-E state, L0 may be referred to as the L1 to L0 exit latency of the PCI-E core 210, for example. The L1 to L0 exit latency may begin when a device wants to initiate a PCI-E transaction, for example, a DMA transfer and may initiate the transition of the PCI-E core 210 to the full power PCI-E state, L0. The L1 to L0 exit latency may end when the PCI-E core 210 has transitioned to the full power PCI-E state, L0.

In operation, when a packet is received by the NIC 202 via the network interface, for example, the Ethernet 212, the data in the packet may enter the NIC 202 at the PHY core 204, and be processed by the MAC 206. The entire packet may be received in order for the MAC 206 to perform a cyclic redundancy check (CRC) on the packet to check for errors. In instances where there are no errors with the packet, the DMA engine 208 may initiate one or more DMA requests to the PCI-E core 210 to transfer the packet to host memory via the PCI-E core 214.

In order to transmit a packet, the server $104_X$ may initiate a PCI-E write transaction to the NIC 202. The NIC 202 may be operable to initiate a DMA read over the PCI-E core 214. The data received from the server $104_X$ may be assembled by the NIC 202 in the MAC 206. The MAC 206 may be operable to transmit the data to the PHY core 204. The PHY core 204 may be operable to transmit the packets via the network interface, for example, the Ethernet 212.

In instances where PCI-E core 210 is in a low power PCI-E state, L1, and the PHY core 204 is in a low power mode, for example, low power idle, the NIC 202 may want to receive a packet via the network interface, for example, the Ethernet 212 at the PHY core 204. The NIC 202 may be operable to speculatively initiate a transition of the PCI-E core 210 from the low power PCI-E state, L1 to the full power PCI-E state, L0, when the PHY core 204 senses that its remote network peer is bringing the network interface back to full power in order to send a packet and before the NIC 202 has received the packet. Accordingly, the NIC 202 may be operable to mask at least a portion of the L1 to L0 exit latency of the PCI-E core 210.

The PHY core 204 may be operable to communicate a signal to the MAC 206 when the PHY core 204 senses that it is about to receive a packet via the network interface, for example, the Ethernet 212. The MAC 206 may be operable to communicate a signal to the PCI-E core 210 to initiate a transition from the low power PCI-E state, L1, to the full power PCI-E state, L0 when the PHY core 204 in the NIC 202 senses that it is about to receive a packet and initiates transition from the low power mode to the full power mode. The communicated signal may be edge triggered or level-triggered, for example. The MAC 206 may be operable to generate a pulse, for example, or assert a signal to initiate a transition from the low power PCI-E state, L1, to the full power PCI-E state, L0.

The timer 216 may be configured for a particular time period after the start of the transition of the PHY core 204 in the NIC 202 from the low power mode to the full power mode, if the L1 to L0 exit latency of the transition from the low power PCI-E state, L1, to the full power PCI-E state, L0, is lesser than the wake time, Tw, of the transition of the PHY core 204 from the low power mode to the full power mode. The timer 216 may also be configured for a particular time period after the transition of the PHY core 204 in the NIC 202 from the low power mode to the full power mode, if the speed of the network interface, for example, the Ethernet 212 to the NIC 202 is lesser than a threshold value, for example, lesser than 1 GBps. Notwithstanding, the invention may not be so limited, and other threshold values may be utilized without limiting the scope of the invention.

In accordance with various embodiments of the invention, one or more transitions from the full power PCI-E state, L0, to the low power PCI-E state, L1, and back to the full power PCI-E state, L0 may be prevented by resetting a PCI-E core 210 inactivity timer earlier than it would have otherwise been reset. The PCI-E core 210 inactivity timer may be utilized to determine when the PCI-E core 210 may transition from a full power PCI-E state, L0, to the low power PCI-E state, L1 due to inactivity. The PCI-E core 210 inactivity timer may be reset, for example, when the PHY core 204 initiates transition from a low power mode to a full power mode. Accordingly, one or more transitions from the full power PCI-E state, L0, to the low power PCI-E state, L1 may be avoided where the PCI-E core 210 inactivity timer was about to expire when the PHY core 204 initiates transition from a low power mode to a full power mode and would have expired before a packet had been received and been ready for DMA via the PCI-E core 214. The NIC 202 may be operable to reduce system latency by avoiding the one or more transitions from the full power PCI-E state, L0, to the low power PCI-E state, L1.

In accordance with various embodiments of the invention, one or more power matching modes for a server $102_{XY}$, a NIC $106_{XY}$ and/or a switch $104_X$ may comprise one or more of a best performance mode, a normal mode, and/or a minimal mode of operation. In a best performance mode of operation, the server $102_{XY}$, NIC $106_{XY}$ and/or switch $104_X$ may be configured to provide the best performance including the networking performance. In a normal mode of operation, the server $102_{XY}$, NIC $106_{XY}$ and/or switch $104_X$ may operate normally and conserve power during idle or low activity periods, and the power management related parameters may be set to provide a balance between the performance and power consumption. In a minimal mode of operation, the server $102_{XY}$, NIC $106_{XY}$ and/or switch $104_X$ may be configured to save power aggressively. The power management related parameters in the minimal mode may be set to minimize the power consumption. The power matching mechanism may be used, for example, to coordinate modes and power saving mechanisms on the NICs $106_{XY}$, servers $102_{XY}$, and switches $104_X$, and tie in different power management policies together to provide domain wide power management of networking components.

A NIC $106_{XY}$ may be influenced by both the platform policies, for example, OS, BIOS, PCIe bus ASPM, and/or a Baseband Management Controller (BMC) as well as the network and its related standards, for example, IEEE, and/or Energy Efficient Ethernet (EEE). Table 1 describes the corresponding ASPM and EEE policies on the NICs $106_{XY}$ and switches $104_X$ for various power modes.

TABLE 1

| Power Mode | NIC ASPM Mode | NIC EEE Policy | Switch EEE Policy |
|---|---|---|---|
| Best Performance | Disabled | Disabled or conservatively applied to optimize for the best performance | Disabled or conservatively applied to optimize for the best performance |
| Normal | L0s | Enabled | Enabled |
| Minimal | L0s/L1 | Enabled (EEE timers values are more aggressive than the EEE timers values in the normal mode) | Enabled (EEE timers values are more aggressive than the EEE timers values in the normal mode) |

In accordance with various embodiments of the invention, one or more features of the power management policy may comprise a domain dynamic power management and dynamic power capping and reporting. The domain dynamic power management may enable domain or sub-domain level power modes that may result in coordinated EEE policies and settings on the NICs $106_{XY}$, servers $102_{XY}$, and switches $104_X$. The dynamic power capping and reporting may provide domain or sub-domain level power maximum and average capping and/or reporting capability. For a given power budget, the LPM $108_X$ may be used to transparently configure appropriate capping on an average link utilization, link speeds, and teaming configurations on the NICs $106_{XY}$, servers $102_{XY}$, and switches $104_X$. The LPM $108_X$ may also be used to notify power management mode mismatches on the NICs $106_{XY}$, servers $102_{XY}$, and switches $104_X$ for a given domain power cap.

The LPM $108_X$ may be used to enable dynamic configuration of power modes for a domain or a sub-domain of NICs $106_{XY}$, servers $102_{XY}$, and switches $104_X$. The NIC Advanced Configuration and Power Interface (ACPI) power management, PCI-e ASPM state management, EEE, ASIC level power management, server power management, and/or switch power management may be combined to provide a domain wide power management solution for the networking components.

cies, comprising High Performance, Balanced, and Power Saver. These system level power policies may be mapped to best performance, normal, and minimal power modes, for example. The OS may support power policy management via Windows management instrumentation (WMI) that may be used for both local and remote management. The OS may enable customizable power policies using scripting or WMI interfaces. The OS power management architecture may provide functionality for power metering and budgeting, such as, inventory information, capability and characteristics, measurement reporting, configurable platform power budget, and/or notifications for changes in configuration and capabilities as well as threshold based notifications.

The server power policy may be mapped to different system power states, such as, processor P-states, processor C-states, device states, PCI-e ASPM states, and/or EEE mode. Table 2 illustrates the mapping of the NIC ASPM and EEE for different system configurations.

TABLE 2

| Power Mode | Power/Sleep State of System | Processor P-State | Processor C-State | Device State | ASPM State | EEE Policy |
| --- | --- | --- | --- | --- | --- | --- |
| Best Performance | G0/S0 | P0 | C0 | D0, D3 | Off | EEE Disabled or conservatively applied to optimize for the best performance |
| Best Performance | G1/S1-S4, G2/S5 | N.A. | N.A. | D3 | Off | EEE Disabled or conservatively applied to optimize for the best performance |
| Normal | G0/S0 | P0-Pn | C0-C3 | D0, D3 | L0s | Enabled |
| Normal | G1/S1-S4, G2/S5 | N.A. | N.A. | D3 | L0s | Enabled |
| Minimal | G0/S0 | P0-Pn | C0-C3 | D0, D3 | L0s/L1 | Enabled (lowest link speed, aggressive EEE timers) |
| Minimal | G1/S1-S4, G2/S5 | N.A. | N.A. | D3 | L0s/L1 | Enabled (lowest link speed, aggressive EEE timers) |

The NICs $106_{XY}$, servers $102_{XY}$, and switches $104_X$ within a domain $100_X$ may be configured to enable dynamic power modes. The dynamic power modes may be configured either globally per domain $100_X$ or based on the power management policies set on each server $102_{XY}$, for example. One or more of the power management modes may be set by the administrator on a server $102_{XY}$, which may result in a NIC $106_{XY}$ or LPM $108_X$ setting some of the underlying parameters, such as EEE timers, ASPM parameters, and/or link speed on the NICs $106_{XY}$ and the corresponding switches $104_X$. The NICs $106_{XY}$ and/or switches $104_X$ may further coordinate to detect system idle conditions or may enable transitioning to a low power mode. A network administrator may enable a specific power mode for a set of NICs $106_{XY}$ and/or switches $104_X$ globally using a power saving mechanism, if the LPM $108_X$ is operable to remotely configure the NIC $106_{XY}$ and/or the BMC to influence the OS power policies.

An OS, for example, the Windows OS may provide a plurality of different exemplary overall system power poli- In accordance with various embodiments of the invention, the management console 150 may be operable to communicate with a BMC for managing power supply modes, fan control, power on/off and reset, power reporting, and/or power budgeting, for example. The power management may be performed remotely using management consoles 150 as well as locally using graphical user interfaces (GUIs) and/or tools.

The OS may be operable to communicate with a BMC to receive power readings and events when the BMC is directly monitoring and/or controlling power supplies and sensors. The BMC may be operable to use ACPI drivers as well as OS level power management policies to enforce power management policies that are exposed by the BMC to the management console 150. The NIC $106_{XY}$ may be operable to participate in the OS power management architecture by supporting the WMI interface and instrumentation. The OS may be operable to control the ACPI and PCIe ASPM states that may impact the NIC $106_{XY}$ power state. The NIC $106_{XY}$ may be operable to follow the directions from the OS and may also independently initiate transition on the link or follow the link partner commands based on EEE.

The EEE settings may be configured on a per link basis by both link partners. One or more cases may be supported, for example, view and/or change EEE settings on a device as an integral part of the server $102_{XY}$ and/or OS power policy, view and/or change end-to-end EEE settings of a domain $100_X$ without requiring to view and/or change EEE settings on a per device basis, policy driven automatic selection of the best set of EEE parameters on a device for a specific power management policy as an integral part of the server $102_{XY}$ and/or OS power policy, policy driven automatic selection of the best set of EEE parameters on every device along an end-to-end path for a specific power management policy, and provide notification for an inconsistent configuration of EEE settings.

One or more parameters may be provided for the EEE settings, for example, EEE enable and/or disable, EEE policy, such as, aggressive, normal, or optimized for best performance. In an aggressive policy, the EEE timers may be set to allow for an aggressive power management. For example, a small timer value may be utilized to wait to detect link idle condition and a high system wait time (Tw_sys) value of the link. In a normal policy, the EEE timers may be set to allow for a balance between system performance and power savings. For example, a small timer value to wait to detect link idle condition and a high Tw_sys value. In an optimized for best performance policy, the EEE timers may be set conservatively to trade off power savings in favor of providing the best performance on the system. A low value of Tw_sys may be suitable to address the requirements of low latency applications and also use a long wait time before deciding to enter into low power mode. One or more supported modes for EEE may comprise 100 Base-TX, 1000 Base-T, 10 GBase-T, 1000 Base-KX, 10 GBase-KX4, and/or 10 GBase-KR. The EEE operation may be asymmetric except for 1000 Base-T, which may be symmetric. Each device may unilaterally decide to place its transmit path in low power mode, for example. The EEE timers may be set in microseconds, and the EEE configuration mismatches, such as enable and/or disable may be notified.

Various aspects of the invention may provide for capping, limiting and/or reporting of power consumed by the physical networking components, for example, NICs $106_{XY}$ and switches $104_X$ within a domain $100_X$. The server $102_{XY}$ power management may comprise the NIC $106_{XY}$ but may not handle the network facing aspects and may not coordinate with the network operation. The LPM $108_X$ may be operable to control an absolute cap on power consumption and/or control an average power consumption that may allow reaching power cost goals, for example. The history of power consumed by these components may also be provided to enable the analysis of power consumed over a period of time. In one mode, the LPM $108_X$ may use the link speed and dynamic teaming to control power consumption while accounting for the maximum power for each device.

In the average power consumption control mode, the LPM $108_X$ may be operable to achieve an average power consumption level per domain $100_X$. In this mode for a given power budget, the LPM $108_X$ may be operable to configure link utilization caps, link speeds, and/or teaming configurations on the NICs $106_{XY}$, servers $102_{XY}$, and switches $104_X$. The LPM $108_X$ may be operable to notify the administrator when it is unable to guarantee a domain power cap based on the configured power management modes and parameters on the NICs $106_{XY}$, servers $102_{XY}$, and switches $104_X$. One or more parameters may be used for the power capping, limiting and reporting of the NICs $106_{XY}$, servers $102_{XY}$, and switches $104_X$, such as a maximum power consumed, an average power consumed or the power consumed over a period of time, a maximum allowable power for capping the average power consumed over a period of time, a power mode for best performance, a normal or minimal mode of operation, power thresholds, and notifications per threshold, such as notify when the power exceeds the threshold, and notify when the power falls below the threshold, for example.

In accordance with an embodiment of the invention, the best matching profile setting of power management mode, link utilization cap, and link speed may be selected based on user setting, which may require the device to cap power consumption at a particular level. There may be a need to adjust link parameters when one link partner is adjusting its setting based on power, while ensuring the new setting is still kept within the limits of the power cap. Such a mismatch may be communicated to the link partner to reach a mutually agreed upon setting that may still honor the power capping.

Figure 3:
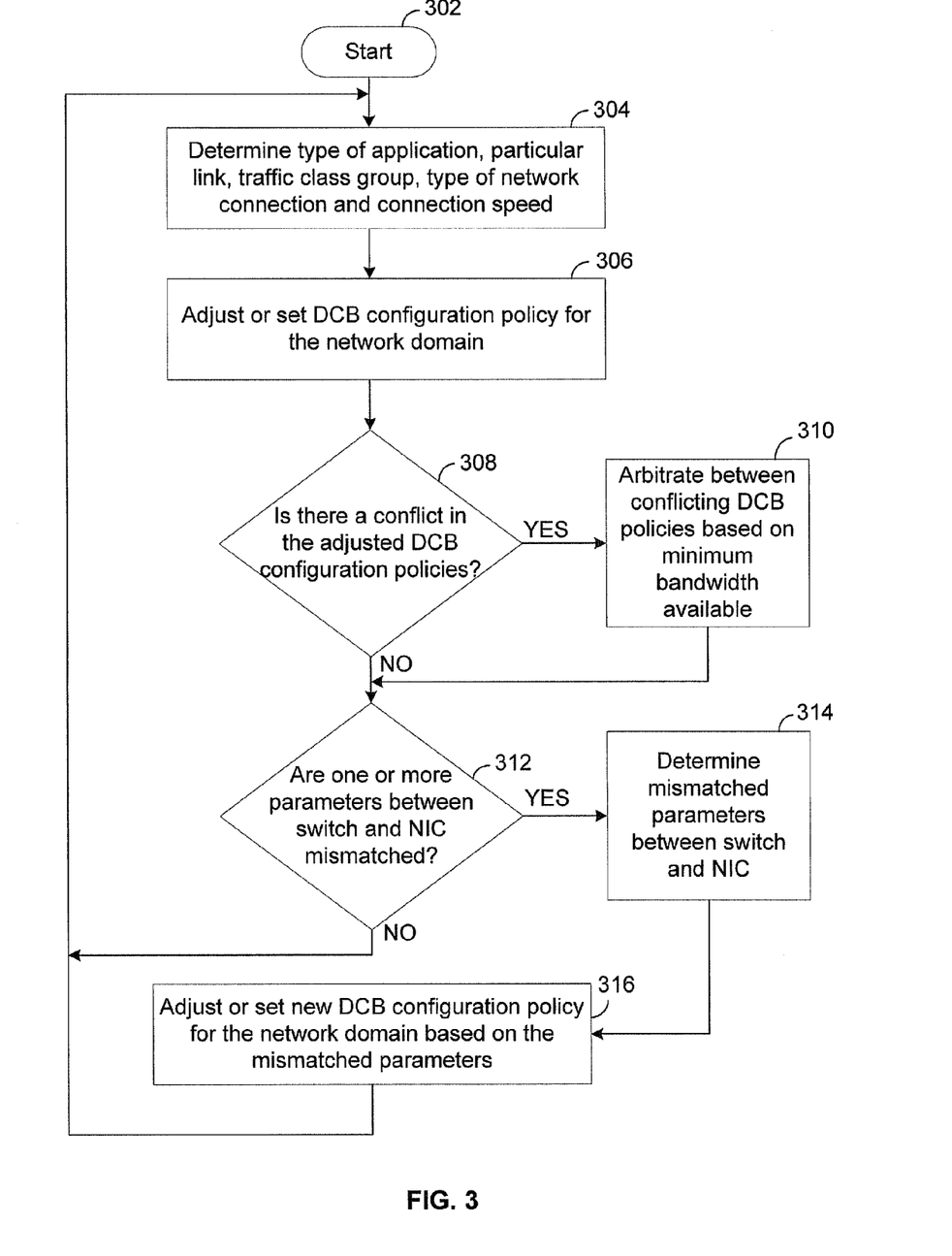
FIG. 3 is a flowchart illustrating exemplary steps for configuration of data center bridging, in accordance with an embodiment of the invention.

FIG. 3 is a flowchart illustrating exemplary steps for configuration of data center bridging, in accordance with an embodiment of the invention. Referring to FIG. 3, exemplary steps may begin at step 302. In step 304, the LPM $108_X$ may be operable to determine the type of application handled by the network domain $100_X$, a particular link handling data, a traffic class group, a type of network connection, and/or the connection speed of the network connection. In step 306, the LPM $108_X$ may be operable to adjust or set the DCB configuration policy of the network domain $100_X$ based on the determined the type of application handled by the network domain $100_X$, the particular link handling data, the traffic class group, the type of network connection, and/or the connection speed of the network connection. For example, one or more priorities may be configured for lossless service while other priorities may be configured for best effort. The policies may comprise identifying the priority or priorities to use for FCoE and/or iSCSI. There may be one or more policy profiles configured for links depending on the mix of applications delivered over those links. The policy profiles may include, for example, minimum and optimal bandwidth allocations per priority or traffic class group. The server administrator may configure which applications are enabled on each NIC $106_{XY}$ or may select a policy profile for each NIC $106_{XY}$.

In step 308, it may be determined whether two or more of the adjusted DCB configuration policies are conflicting. In instances where two or more of the adjusted DCB configuration policies are conflicting, control passes to step 310. In step 310, the LPM $108_X$ may be operable to arbitrate between the two or more conflicting DCB configuration policies, for example, between NICs $106_{XY}$ and switches $104_X$ based on a minimum bandwidth available. In instances where two or more policies interfere or conflict, the LPM $108_X$ may be operable to determine the best possible configuration, such that priorities may be given at least their minimum bandwidth if their optimal bandwidth is not available. The LPM $108_X$ may also report and/or send error messages based on results such as when it cannot provide the minimum bandwidth. Control then passes to step 312. In instances where there is no conflict between two or more of the adjusted DCB configuration policies, control passes to step 312.

In step 312, it may be determined whether one or more parameters between a switch $104_X$ and a NIC $106_{XY}$ are mismatched. In instances where one or more parameters between a switch $104_X$ and a NIC $106_{XY}$ are mismatched, control passes to step 314. In step 314, the one or more parameters of the switch $104_X$ and the NIC $106_{XY}$ that are mismatched may be determined, for example, one or more of PFC parameters, ETS parameters, and/or QCN parameters. For example, one or more PFC mismatches may occur, such as switch $104_X$ and NIC $106_{XY}$ PFC enable mismatch, switch $104_X$ and NIC $106_{XY}$ PFC enabled priorities mismatch, a maximum frame size for PFC priority does not match at link partners, and a maximum frame size for port may not match at link partners. One or more ETS mismatches may occur, such as switch $104_{1X}$ and NIC $106_{XY}$ ETS enable mismatch, priorities in the same traffic class may not all be in the same traffic class group or a traffic class may be a subset of one traffic class group, and bandwidth allocations may not match LPM $108_X$ configured guidelines. One or more QCN mismatches may occur, such as switch $104_X$ and NIC $106_{XY}$ QCN enabled mismatch, and switch $104_X$ and NIC $106_{XY}$ QCN enabled priorities mismatch. One or more DCB global mismatches may occur, such as PFC and non-PFC priorities sharing a traffic class or group, different assignment of application to traffic classes on different links in the domain, and a DCB wide consistency mismatch.

In step 316, the LPM $108_X$ may be operable to adjust or set a new DCB configuration policy of the network domain $100_X$ based on the mismatched parameters between the switch $104_X$ and the NIC $106_{XY}$. Control then returns to step 304. In instances where there is no mismatch between one or more parameters between a switch $104_X$ and a NIC $106_{XY}$, control returns to step 304.

Figure 4:
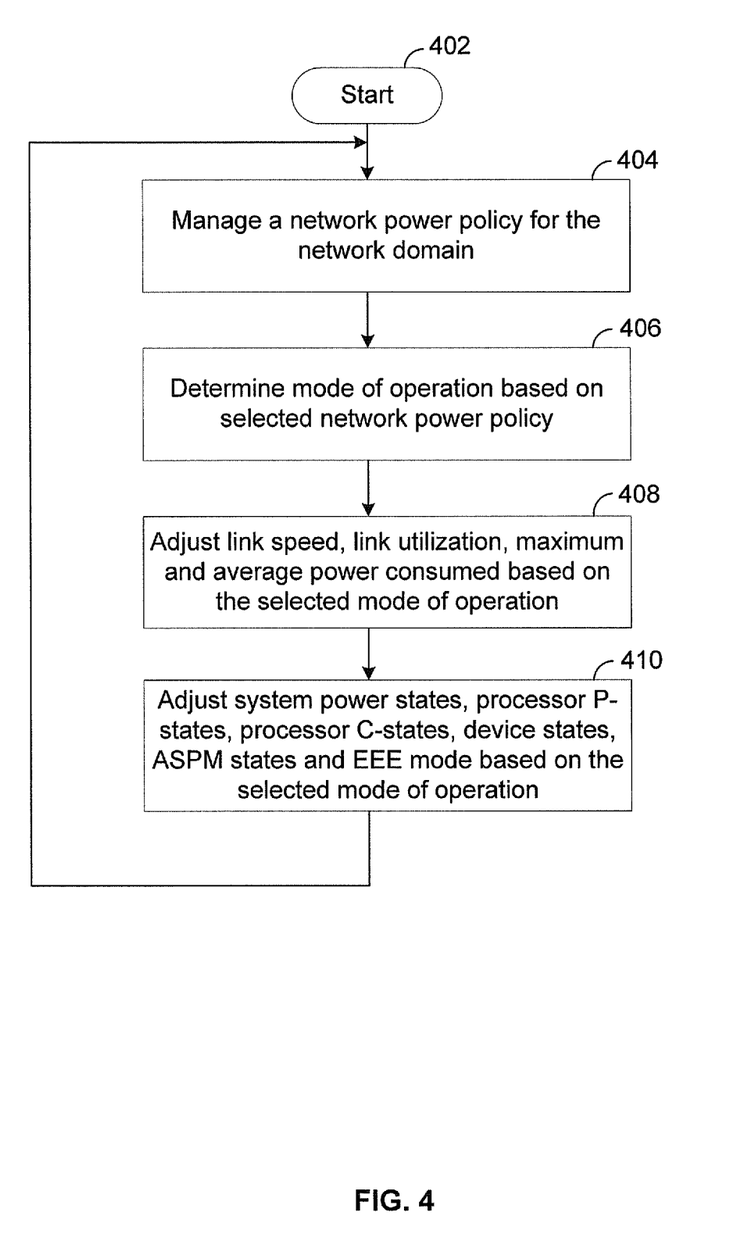
FIG. 4 is a flowchart illustrating exemplary steps for managing network power policy, in accordance with an embodiment of the invention.

FIG. 4 is a flowchart illustrating exemplary steps for managing network power policy, in accordance with an embodiment of the invention. Referring to FIG. 4, exemplary steps may begin at step 402. In step 404, the LPM $108_X$ may be operable to manage a network power policy for the network domain $100_x$. In step 406, the LPM $108_X$ may be operable to select one or more of a best performance mode, a normal mode, and/or a minimal mode of operation of the one or more devices, for example, NICs $106_{XY}$, switches $104_X$, and/or servers $102_{XY}$ based on the managed network power policy for the network domain $100_x$.

In a best performance mode of operation, the server $102_{XY}$, NIC $106_{XY}$ and/or switch $104_X$ may be configured to provide the best performance including the networking performance. In a normal mode of operation, the server $102_{XY}$, NIC $106_{XY}$ and/or switch $104_X$ may operate normally and conserve power during idle or low activity periods, and the power management related parameters may be set to provide a balance between the performance and power consumption. In a minimal mode of operation, the server $102_{XY}$, NIC $106_{XY}$ and/or switch $104_X$ may be configured to save power aggressively. The power management related parameters in the minimal mode may be set to minimize the power consumption.

In step 408, the LPM $108_X$ may provide domain or sub-domain level power maximum and average capping and/or reporting capability. For a given power budget, the LPM $108_X$ may be operable to transparently configure appropriate capping on an average link utilization, link speeds, a maximum power consumed, and/or an average power consumed by the one or more devices, for example, NICs $106_{XY}$, switches $104_X$, and/or servers $102_{XY}$ based on the selected mode of operation.

In step 410, the LPM $108_X$ may be operable to adjust one or more of system power states, processor P-states, processor C-states, said one or more devices' states, PCI-E ASPM states, and/or EEE mode based on the selected mode of operation. The LPM $108_X$ may be used to enable dynamic configuration of power modes for a domain or a sub-domain of NICs $106_{XY}$, servers $102_{XY}$, and switches $104_X$. Control then returns to step 404.

In accordance with an embodiment of the invention, a method and system for managing network power policy and configuration of data center bridging may comprise a network domain $100_x$ (FIG. 1), which comprises a single LPM $108_x$ (FIG. 1), that coordinates operation of one or more devices, for example, NICs $106_{XY}$, switches $104_X$, and/or servers $102_{XY}$. One or more processors and/or circuits in the LPM $108_x$ may be operable to manage one or both of a network power policy and/or a data center bridging (DCB) configuration policy for the network domain $100_x$. One or more processors and/or circuits in the LPM $108_x$ may be operable to adjust the DCB configuration policy of the network domain $100_x$ based on one or more of a particular application, a particular link, a traffic class group, a type of network connection, and/or connection speed. One or more processors and/or circuits in the LPM $108_x$ may be operable to arbitrate between two or more conflicting DCB configuration policies for one or more devices, for example, between NICs $106_{XY}$ and switches $104_X$ based on a minimum bandwidth available. One or more processors and/or circuits in the LPM $108_x$ may be operable to manage the DCB configuration policy for the network domain $100_x$ based on one or more parameters of a switch $104_X$ and a NIC $106_{XY}$ that are mismatched. The one or more parameters of the switch $104_X$ and the NIC $106_{XY}$ that are mismatched may comprise one or more of PFC parameters, ETS parameters, and/or QCN parameters.

One or more processors and/or circuits in the LPM $108_x$ may be operable to select one or more of a best performance mode, a normal mode, and/or a minimal mode of operation of the one or more devices, for example, NICs $106_{XY}$, switches $104_X$, and/or servers $102_{XY}$ based on the managed network power policy for the network domain $100_x$. One or more processors and/or circuits in the LPM $108_x$ may be operable to adjust one or more of a link speed, a link utilization, a maximum power consumed, and/or an average power consumed by the one or more devices, for example, NICs $106_{XY}$, switches $104_X$, and/or servers $102_{XY}$ based on the selected mode of operation. One or more processors and/or circuits in the LPM $108_x$ may be operable to adjust one or more of system power states, processor P-states, processor C-states, said one or more devices' states, PCI-E ASPM states, and/or EEE mode based on the selected mode of operation. One or more processors and/or circuits in the LPM $108_x$ may be operable to manage one or both of the network power policy and/or the DCB configuration policy for a portion of the one or more devices, for example, NICs $106_{XY}$, switches $104_X$, and/or servers $102_{XY}$ in the network domain $100_x$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for managing network power policy and configuration of data center bridging.

Accordingly, the present invention may be realized in hardware or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a network domain comprising a single logical point of management (LPM) that coordinates operation of one or more devices in said network domain, respective devices of the one or more devices in said network domain having respective power and operation modes:
   managing by said single LPM, a network power policy and a data center bridging (DCB) configuration policy for said network domain based on one or more parameters of a switch and a network interface controller (NIC) that are mismatched, including
   receiving the network power policy for the network domain,
   determining respective power and operation modes for the respective devices using the received network power policy;
   adjusting respective communication parameters for communication among the respective devices to satisfy performance requirements for said communication among the respective devices in said network domain among a plurality of modes relating power consumption and communication performance of the respective devices and also to satisfy the received network power policy;
   selecting a mode of operation of said one or more devices based on said managed network power policy for said network domain; and
   arbitrating between two or more conflicting DCB configuration policies for said one or more devices based on a minimum bandwidth available.

2. The method according to claim 1, wherein said one or more devices comprises one or more of: network interface controllers (NICs), switches, or servers.

3. The method according to claim 1, comprising adjusting said DCB configuration policy based on one or more of: a particular application, a particular link, a traffic class group, a type of network connection, or connection speed.

4. The method according to claim 1, wherein said one or more parameters of said switch and said NIC that are mismatched comprise one or more of: Priority Flow Control (PFC) parameters, Enhanced Transmission Selection (ETS) parameters, or quantized congestion notification (QCN) parameters.

5. The method according to claim 1, wherein selecting a mode of operation comprises selecting one or more of: a best performance mode, a normal mode, or a minimal mode of operation of said one or more devices based on said managed network power policy for said network domain.

6. The method according to claim 1, comprising adjusting one or more of: a link speed, a link utilization, a maximum power consumed, or an average power consumed by said one or more devices based on said selected mode of operation.

7. The method according to claim 5, comprising adjusting one or more of: system power states, processor P-states, processor C-states, said one or more devices' states, active state power management (ASPM) states, or energy efficient Ethernet (EEE) mode based on said selected mode of operation.

8. The method according to claim 1, comprising managing by said single LPM, one or both of: said network power policy or said DCB configuration policy for a portion of said one or more devices in said network domain.

9. A system for networking, the system comprising:
   one or more processors or circuits for use in a single logical point of management (LPM) in a network domain, wherein said LPM is operable to coordinate operation of one or more devices in said network domain, said one or more processors or circuits being operable to:
   manage a network power policy and a data center bridging (DCB) configuration policy for said network domain based on one or more parameters of a switch and a network interface controller (NIC) that are mismatched, including
   receive the network power policy,
   using the received network power policy, determine a mode of operation for the devices of the one or more devices in said network domain among a plurality of modes relating power consumption and communication performance of the respective devices;
   adjust respective communication parameters for communication among the respective devices according to the determined mode of operation;
   selecting a mode of operation of said one or more devices based on said managed network power policy for said network domain; and
   arbitrating between two or more conflicting DCB configuration policies for said one or more devices based on a minimum bandwidth available; and
   from time to time, adjust the respective communication parameters dynamically according to the determined mode of operation and changes in communication performance and power setting for the network domain.

10. The system according to claim 9, wherein said one or more devices comprises one or more of: network interface controllers (NICs), switches, or servers.

11. The system according to claim 9, wherein said one or more processors or circuits are operable to adjust said DCB configuration policy based on one or more of: a particular application, a particular link, a traffic class group, a type of network connection, or connection speed.

12. The system according to claim 9, wherein said one or more parameters of said switch and said NIC that are mismatched comprise one or more of: Priority Flow Control (PFC) parameters, Enhanced Transmission Selection (ETS) parameters, or quantized congestion notification (QCN) parameters.

13. The system according to claim 9, wherein said one or more processors or circuits are operable to select as the mode of operation one or more of: a best performance mode, a normal mode, or a minimal mode of operation of said one or more devices based on said managed network power policy for said network domain.

14. The system according to claim 9, wherein said one or more processors or and/or circuits are operable to adjust one or more of: a link speed, a link utilization, a maximum power consumed, or an average power consumed by said one or more devices based on said selected mode of operation.

15. The system according to claim 13, wherein said one or more processors or circuits are operable to adjust one or more of: system power states, processor P-states, processor C-states, said one or more devices' states, active state power management (ASPM) states, or energy efficient Ethernet (EEE) mode based on said selected mode of operation.

16. The system according to claim 9, wherein said one or more processors or circuits are operable to manage one or both of: said network power policy or said DCB configuration policy for a portion of said one or more devices in said network domain.

* * * * *